2,286,313

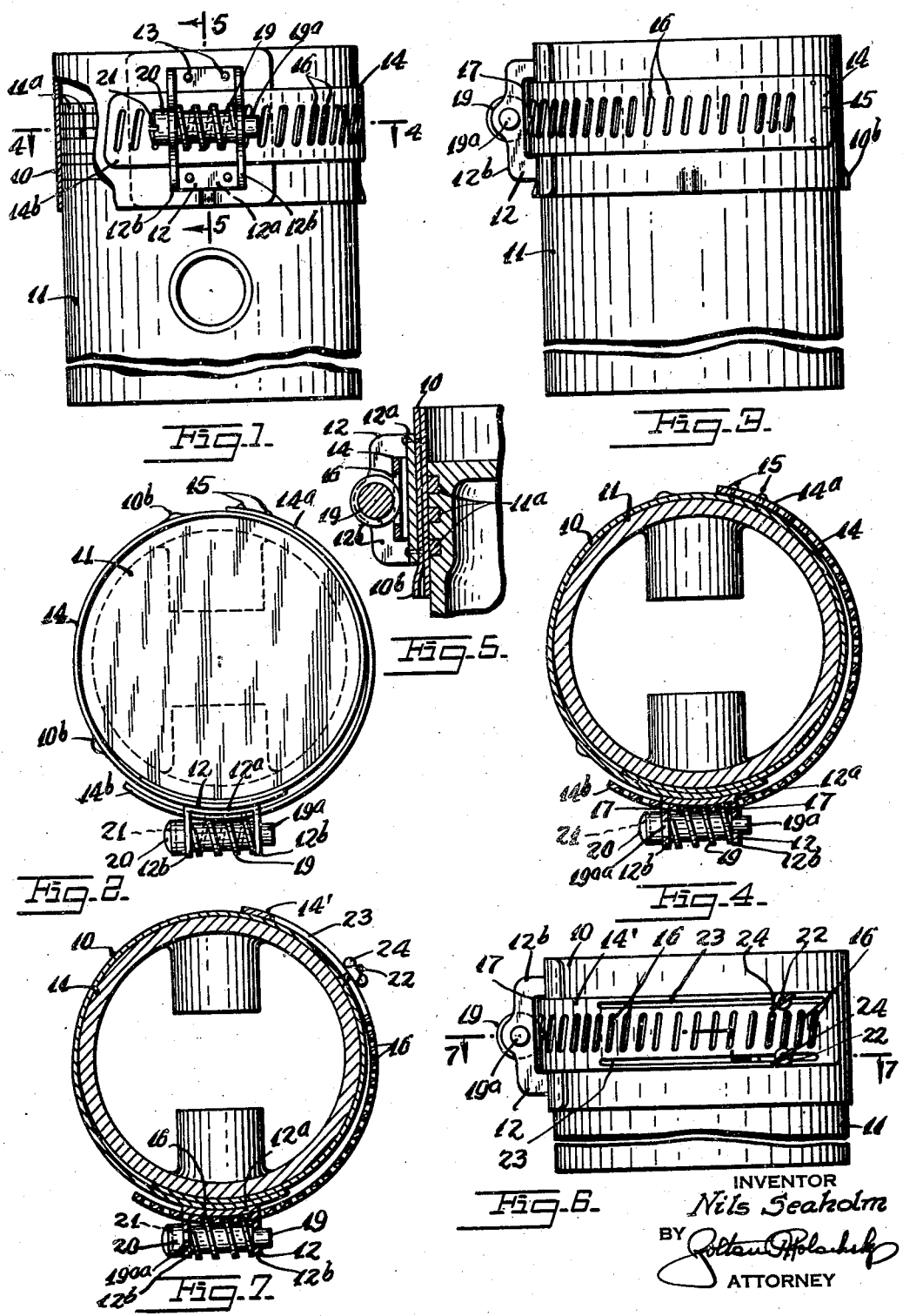
June 16, 1942. N. SEAHOLM 2,286,313
COMPRESSOR CLAMP FOR PISTON RINGS
Filed July 26, 1940
INVENTOR
Nils Seaholm
BY
ATTORNEY Patented June 16, 1942

UNITED STATES PATENT OFFICE 2,286,313

COMPRESSOR CLAMP FOR PISTON RINGS

Nils Seaholm, Mount Vernon, N. Y.

Application July 26, 1940, Serial No. 347,686

3 Claims. (Cl. 29—86.4)

This invention relates to new and useful improvements in a compressor clamp for piston rings.

The invention proposes the construction of a compressor clamp which is characterized by a base strip of flexible strong sheet material for engaging about a piston and over the piston rings thereof, and a top strip of flexible strong material attached at one end on an area intermediate of the ends of said base strip and having its other end associated with a worm pinion in such a way that the worm pinion may be turned to cause the top strip to move relative thereto and to clamp the base strip over the piston rings for pressing and holding them in position.

Still further, it is proposed that the worm pinion be mounted on a bracket which is mounted on one end of the base strip, and it is proposed that the top strip be formed with a plurality of inclined slots into which the threads of the worm pinion engage and co-act with the parallel slots of the top strip to move the top strip, and so indirectly cause the base strip to compress and hold the piston rings.

Heretofore compressor clamps have been used which consist of a base strip, a top strip having the parallel slots, and a spur pinion rotatively mounted and having its teeth engage the slots so that when the spur pinion is turned the base strip will compress the piston rings.

The defect of this prior construction resides in the fact that a spur pinion lacks sufficient frictional resistance to maintain and hold the top strip in its compressing position, and on the other hand a worm pinion as proposed by this invention has so large a mechanical advantage that after the pressure has been applied it will not turn back and permit the base strip to become loose.

Still further the invention proposes a novel and simple arrangement for mounting the worm pinion in position. A bracket of a certain construction is contemplated.

The invention has for a further modified object the teaching of an arrangement by which the top strip may be shifted relative to the base strip in such a way that the compressor clamp will be adjustable to pistons of greatly different diameters. Heretofore it was possible to use the compressor clamps for pistons of approximately the same diameter, only.

Another object of the invention resides in the construction of a compressor clamp as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is an elevational view of a compressor clamp mounted on a piston, and constructed in accordance with this invention, a portion of the compressor clamp being broken away to disclose the piston rings.

Fig. 2 is a plan view of Fig. 1.

Fig. 3 is a side elevational view of Fig. 1 looking from the right hand side.

Fig. 4 is a horizontal sectional view taken on the line 4—4 of Fig. 1.

Fig. 5 is a fragmentary vertical sectional view taken on the line 5—5 of Fig. 1.

Fig. 6 is a side elevational view similar to Fig. 1 but showing a compressor clamp constructed in accordance with a modification of this invention.

Fig. 7 is a horizontal sectional view taken on the line 7—7 of Fig. 6.

The compressor clamp for piston rings in accordance with this invention includes a base strip 10 of flexible strong sheet material for engaging about a piston, such as the piston 11. This piston is provided with the usual piston rings 11a. The base strip 10 is adapted to engage over the piston rings 11a for compressing them into their grooves, as hereinafter more fully explained.

A bracket 12 having a base wall 12a is mounted on one end portion of the said base strip 10. More specifically, the base wall 12a of the bracket 12 rests against the outer face of the end portion of said base strip 10. It is fixedly held in position by several rivets 13, or several fastening elements, engaged through these parts. The bracket 12 is also provided with a pair of parallel side walls 12b projecting at right angles to the base wall 12a. A top strip of flexible strong material 14 is attached at one of its ends 14a upon an intermediate area of the ends of said base strip 10. Several rivets 15, or other fastening elements, are used to fixedly attach the said end 14a of the top strip 14.

The top strip 14 has a plurality of inclined parallel slots 16 extending in a row along its length. The free end 14b of top strip 14 passes through slots 17 formed in the side walls 12ᵇ of the bracket 12. The slots 17 are immediately adjacent the base wall 12ᵃ, so that a portion of the strip 14 extends along the base wall 12ᵃ of the bracket 12.

A worm pinion 19 is rotatively mounted between said side walls 12ᵇ, one side of this pinion engages against the strip 14. The threads of the pinion 19 at said side extend into the parallel slots 16. The pinion 19 is rotatively supported at one end by a reduced end portion 19ᵃ which is rotatively engaged through one of the side walls 12ᵇ of the bracket 12. The other end of the pinion is rotatively supported by another reduced end 19ᵃᵃ which is rotatively engaged through the other side wall 12ᵇ. This reduced end 19ᵃᵃ at its outer side is provided with a head 20. The head 20 is formed with a slot 21 adapted to be engaged by a screw driver or other turning tool.

The base strip 10 is formed with a plurality of outwardly projecting portions 10ᵇ at spaced points along its bottom edge. These portions are adapted to engage over the top face of the engine block when the compressor clamp is used so as to prevent the base strip 10 of the clamp slipping into the bore in the block for the piston.

The operation of the invention is as follows:
The worm pinion 19 is turned so that the top strip 14 moves towards the right, in relation to Fig. 4, this opens up the base strip 10. The compressor clamp may now be engaged over the top of the piston 11 and over the piston rings 11a, while the piston rings are loose and extended from the side walls of the piston. Then the worm pinion 19 may be turned to move the strip 14 to the left. This contracts the base strip 10 and contracts the piston rings 11ᵃ so that they are forced into the grooves in the piston 11. The parts are then in the position illustrated in Fig. 1. In this condition the piston 11 may be placed into the bore in the cylinder block. Then with a mallet, or other suitable tool, the piston 11 may be driven down, and the piston rings in their contracted position will be forced into the bore in the engine block. In this way the piston is set in position.

The dominating feature of the invention resides in the fact that the worm pinion 19 will maintain its position, holding the top strip 14 and the base strip 10 in their positions compressing the piston rings 11a. No foreign holding means is necessary. Frictional resistance of the teeth of the worm pinion engaging the slots 16 will be sufficient. It is in this respect that the invention radically differs from prior constructions in which a pinion of the spur gear type was used in compressor clamps. Pinions of this type have the tendency of turning very easily and they cannot hold pressures as can the worm pinions.

In Figs. 6 and 7 a modified form of the invention has been disclosed which distinguishes from the prior form in the fact that the compressor clamp is provided with a top strip 14' which is adjustably mounted on the base strip 10 so that it may be shifted longitudinally of the length of the base strip. More specifically, several studs 22 are mounted on the base strip 10 and extend into elongated slots 23 formed longitudinally on the top strip 14'. The studs 22 are provided with wing nuts 24 extending over edge portions of the slots 23. The slots 23 are arranged above and below the end portions of the inclined parallel slots 16.

In other respects this form of the invention is identical to the previous form and identical parts have been indicated by the same reference numerals.

The advantage of the modified construction resides in the fact that the wing nuts 24 may be loosened and the top strip 14' may be shifted towards or away from the bracket 12. This change of position will vary the operative diameter of the base strip 10 so that the compressor clamp may be engaged upon pistons varying radically in diameters.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A compressor clamp for piston rings having a base strip of flexible strong sheet material for engaging about a piston over its piston rings and top strip of flexible strong material attached at one end to an intermediate portion of said base strip and formed with a plurality of inclined parallel slots, a bracket having a base wall mounted on one end of said base strip with horizontally spaced vertically extending side walls continuing from the ends of said base wall, said bracket being formed with slots at the junction of its side walls and base wall through which the free end of said top strip extends, and a worm pinion rotatively supported between side walls and having one side meshing with certain of said slots, and means for holding the attached end of said top strip in various positions along the length of said base strip, comprising clamp screws and nuts mounted on said base strip and engaging longitudinally extending slots formed in said top strip.

2. A compressor clamp for piston rings having a base strip of flexible strong sheet material for engaging about a piston over its piston rings and a top strip of flexible strong material attached at one end to an intermediate portion of said base strip and formed with a plurality of inclined parallel slots, a bracket having a base wall mounted on one end of said base strip with horizontally spaced vertically extending side walls continuing from the ends of said base wall, said bracket being formed with slots at the junction of its side walls and base wall through which the free end of said top strip extends, and a worm pinion rotatively supported between side walls and having one side meshing with certain of said slots, and means for holding the attached end of said top strip in various positions along the length of said base strip, comprising clamp screws and nuts mounted on said base strip and engaging longitudinally extending slots formed in said top strip, said longitudinally extending slots being extended along the edge portions of said top strip adjacent the ends of said inclined parallel slots.

3. A compressor clamp for piston rings having a base strip of flexible strong sheet material for engaging about a piston over its piston rings and a top strip of flexible strong material attached at one end to an intermediate portion of said base strip and formed with a plurality of inclined parallel slots, a bracket having a base wall mounted on one end of said base strip with horizontally spaced vertically extending side walls continuing from the ends of said base wall, said bracket being formed with slots at the junction of its side walls and base wall through which the free end of said top strip extends, and a worm pinion rotatively supported between said side walls and having one side meshing with certain of said slots, and means for holding the attached end of said top strip in various positions along the length of said base strip, comprising clamp instrumentalities mounted on one of said strips and engaging longitudinally extending slots formed in the other strip.

NILS SEAHOLM.